US006836570B2

(12) United States Patent
Young et al.

(10) Patent No.: US 6,836,570 B2
(45) Date of Patent: Dec. 28, 2004

(54) METHOD FOR CONTRAST-ENHANCEMENT OF DIGITAL PORTAL IMAGES

(75) Inventors: Susan S. Young, Buffalo, NY (US); William E. Moore, Macedon, NY (US); David H. Foos, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 587 days.

(21) Appl. No.: 09/993,953

(22) Filed: Nov. 14, 2001

(65) Prior Publication Data

US 2003/0091222 A1 May 15, 2003

(51) Int. Cl.[7] .................................................. G06K 9/40
(52) U.S. Cl. ...................... 382/274; 382/128; 382/132; 382/263; 382/275; 378/62; 378/87; 358/3.26; 358/520
(58) Field of Search ................................. 382/128, 131, 382/132, 252, 260, 274, 275, 266; 378/62, 87, 98; 358/3.26, 519, 520

(56) References Cited

U.S. PATENT DOCUMENTS

| | | | | |
|---|---|---|---|---|
| 5,307,264 A | * | 4/1994 | Waggener et al. | 378/14 |
| 5,850,836 A | * | 12/1998 | Steiger et al. | 600/300 |
| 6,094,152 A | | 7/2000 | Cheng | |
| 6,226,355 B1 | * | 5/2001 | Prins | 378/158 |
| 6,333,991 B1 | * | 12/2001 | Schreiber et al. | 382/132 |
| 6,626,569 B2 | * | 9/2003 | Reinstein et al. | 378/206 |
| 6,708,054 B2 | * | 3/2004 | Shukla et al. | 600/411 |

OTHER PUBLICATIONS

"Adaptive Histogram Equalization and Its Variations", Computer Vision, Graphics and Image Processing, vol. 39, pp. 355–368, 1987, Stephen M Pizer, Philip Amburn, John D. Austin, Robert Cromartie, Ari Geselowitz, Trey Greer, Bart Ter Haar Romney, John B. Zimmerman, Karel Zuiderveld.

"Automatic Digital Contrast Enhancement of Radiotherapy Films", I.J. Radiation Oncology, Biology, Physics, vol. 13, No. 5, May 1987, George W. Sherouse, Julian Rosenman, Harris L. McMurry, Stephen M. Pizer, Edward L. Chaney.

"Portal Film Enhancement: Technique and Clinical Utility", Technical Innovations and Notes, I.J. Radiation, Oncology, Biology, Physics, vol. 25, No. 2, 1993.

"The enhancement of radiotherapy verification images by an automated edge detection technique", Medical Physics, vol. 19, No. 3, May/Jun. 1992, Konrad W. Lszczynski.

* cited by examiner

Primary Examiner—Bhavesh M. Mehta
Assistant Examiner—Yosef Kassa
(74) Attorney, Agent, or Firm—William F. Noval

(57) ABSTRACT

A method for enhancing the image contrast of digital portal images for presentation on an output medium comprising: providing an input digital portal image having radiation and collimation fields; locating and labeling said radiation and collimation fields to produce labeled radiation and labeled collimation field images; designing a tone scale curve to display the image inside the radiation field using the full dynamic range of the output medium; applying said tone scale curve to the input digital portal image to produce a tone-scaled radiation field image; designing a tone scale curve to display the image outside the radiation field using the full dynamic range of said output medium; applying said tone scale curve to the input digital portal image to produce a tone-scaled collimation field image; enhancing the image contrast of said tone-scaled radiation field image and said tone-scaled collimation field image; combining said enhanced images using the labeled radiation and collimation field images; and black-surrounding the collimation field to produce a contrast enhancement output image which can be presented on said output medium.

18 Claims, 11 Drawing Sheets

METHOD FOR CONTRAST-ENHANCEMENT OF DIGITAL PORTAL IMAGES

FIELD OF THE INVENTION

This invention relates in general to a method for enhancing an image that is composed of two or more regions with different gray level concentrations, and more particularly to a method for visual enhancement of anatomical details in digital portal images that possess multiple X-ray exposure fields.

BACKGROUND OF THE INVENTION

The American Cancer Society estimated that more than 1.2 million new cases of invasive cancer would be diagnosed in the United States in the year of 2000. Moreover, the estimate shows a doubling of cancer cases every 15 years. In the radiation treatment of cancer patients, portal imaging is an important tool for the optimization of treatment. Currently, digital imaging methods, e.g., computed radiography (CR), are being used to acquire digital portal images for radiation therapy. In this case, digital image processing methods can be used to optimally display the resultant portal images.

Portal images are used to evaluate the position of the radiation beam and the placement of x-ray radiation shielding blocks with respect to the patient's anatomy. When portal images are taken before the treatment, they give the radiation oncologists the opportunity of correcting for minor patient positioning errors. When portal images are taken during treatment, they provide a means of monitoring patient movement. A portal image may be acquired by two (or more) radiation exposures.

A first exposure is taken only with the collimator mounted. Then the shielding blocks are mounted in front of the collimator before the second (or the following) exposure is taken. Interior of the shielding blocks is the treatment field, which is called the radiation field. The collimation field represents the interior of the collimator where the useful patient anatomic locations are recorded. There is no treatment information exterior of the collimation field. The image portions inside and outside the radiation field have different gray level concentrations because of different radiation doses that are applied to inside and outside the radiation field. Therefore, the edges of the radiation field appear relatively strong indicating the placement of the shielding blocks. However, because of the high energy of the radiation, digital portal images suffer from systematic low contrast.

It is desirable to increase the contrast of a patient's anatomy inside and outside the radiation field. It is further desirable to reduce the differences of the gray level appearances inside and outside the radiation field such that the image details both inside and outside the radiation field are displayed using the full dynamic range of the output medium such as film or a high resolution display monitor. Moreover, the edges of the radiation filed should be preserved and even highlighted. Therefore, the processed portal images can provide radiation oncologists with the opportunity to check the treatment setup accurately and reduce localization errors.

Several methods of enhancing portal images were developed by Pizer's group and Shalev and his co-workers (see S. M. Pizer, E. P. Amburn, J. D. Austin, et al. "Adaptive histogram equalization and its variations", *Computer Vision, Graphic, and Image Processing*, 39, pp. 355–368, 1987; G. W. Sherous, J. Rosenman, H. McMurry et al. "Automatic digital contrast enhancement of radiotherapy films", *Int J Radiation Oncology Biol Phys*, Vol. 13, pp. 801–806, 1987; J. Rosenman, C. A. Roe, R. Cromartie et al. "Portal film enhancement: technique and clinical utility", *Int J Radiation Oncology Biol Phys*, Vol. 25, pp. 333–338, 1993; K. W. Leszczynski, S. Shalev, and N. S. Cosby, "The enhancement of radiotherapy verification images by an automated edge detection technique", *Medical Physics*, Vol. 19, no. 3, pp. 611–612, 1992). Their methods are based on histogram equalization and unsharp masking techniques. A significant drawback of using histogram equalization is the loss of definition on the edges of the radiation field. Unsharp masking is disadvantageous because it degrades edge information by causing edge banding effect around the edges of the radiation field. Shalev et al. developed a method to delineate the radiation field while still using the histogram equalization method. Yet, the image inside and outside the radiation field still contained different gray level concentrations. This limited the image contrast enhancement when displayed on an output medium.

Another method of enhancing the contrast of a portal image is described by Cheng (see U.S. Pat. No. 6,094,152, "Algorithm for A/D window control for electronic portal image acquisition in a radiotherapy system", Jul. 25, 2000, F. T. Cheng). This method is designed to increase the signal-to-noise ratio of the portal images during the image acquisition stage. This is an important operation. But it is different from the digital image processing technique of the present invention, which enhance image contrast after the image acquisition.

SUMMARY OF THE INVENTION

According to the present invention, there is provided a solution to the problems and fulfillment of the needs discussed above.

According to a feature of the present invention, there is provided a method for enhancing the image contrast of digital portal images for presentation on an output medium comprising: providing an input digital portal image having radiation and collimation fields; locating and labeling said radiation and collimation fields to produce labeled radiation and labeled collimation field images; designing a tone scale curve to display the image inside the radiation field using the full dynamic range of the output medium; applying said tone scale curve to the input digital portal image to produce a tone-scaled radiation field image; designing a tone scale curve to display the image outside the radiation field using the full dynamic range of said output medium; applying said tone scale curve to the input digital portal image to produce a tone-scaled collimation field image; enhancing the image contrast of said tone-scaled radiation field image and said tone-scaled collimation field image; combining said enhanced images using the labeled radiation and collimation field images; and black-surrounding the collimation field to produce a contrast enhancement output image which can be presented on said output medium.

ADVANTAGEOUS EFFECT OF THE INVENTION

The invention provides a general method of enhancing the image contrast in a digital portal image without adding the edge-banding artifacts around high-contrast edges. The invention has the following advantages.

1. The image details of the patient anatomy both inside and outside radiation field are enhanced.

2. The image details of the patient anatomy both inside and outside the radiation field are displayed using the full dynamic range of the output medium.

3. The edges of the radiation field are preserved without degradation in the output digital portal image.

DETAILED DESCRIPTION OF THE INVENTION

Figure 10:
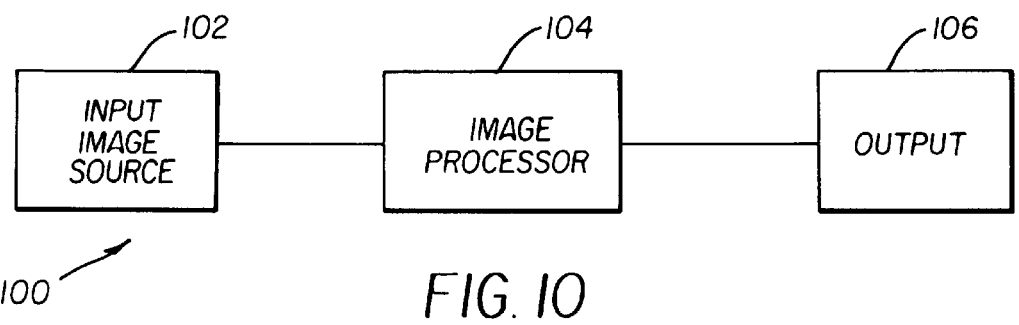
FIG. 10 is a block diagram of a system for carrying out the present invention.

In general, the present invention provides a method for enhancing a region that is composed of two or more regions with different gray level concentrations. The method is particularly applicable to the visual enhancement of anatomical details in digital portal images that possess multiple X-ray exposure fields. FIG. 10 shows a system for carrying out the present invention. As shown, system 100 includes an input image source 102, image processor 104 and output 106. Input image source 102 provides an input digital image that is composed of two or more regions with different gray level concentrations. In the preferred embodiment, source 102 is a source of a digital portal image that possesses multiple X-ray exposure fields. Source 102 can, for example, be a direct digital X-ray system that converts an X-ray image directly into a digital X-ray image. Source 102 may also be a computed radiography system in which an X-ray image is recorded in a storage phosphor plate which is then read out to produce an input digital X-ray image.

Image processor 104 carries out the method of the present invention and can be a digital computer. Image processor 104 can also include appropriate firmware and/or hardware for carrying out digital image processing.

Output 106 can be a high resolution electronic display, such as a computer monitor, or a printer which produces a permanent copy of the processed digital X-ray image on output media such as film or paper.

Figure 11:
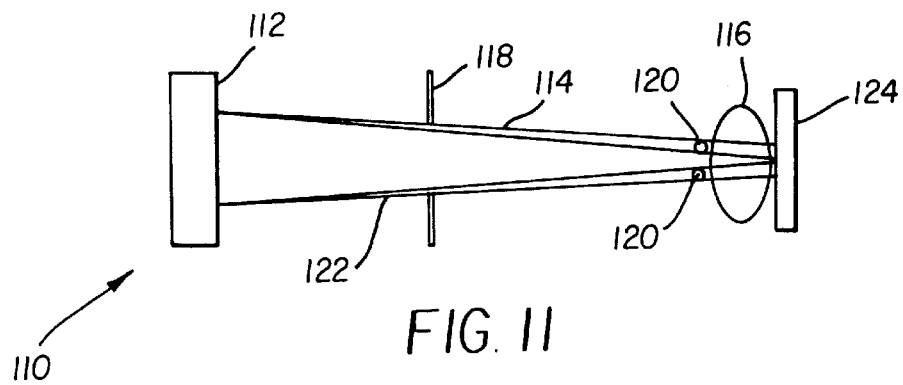
FIGS. 11 and 12 are diagrammatic views useful in illustrating the present invention.

FIG. 11 shows a diagrammatic view of a projection X-ray system illustrating an input image source. As shown, system 110 includes an X-ray source 112 of an X-ray beam 114 which can be used for radiation treatment of a patient 116. Collimator blades 118 are adjusted to shape the size of beam 114. Shielding blocks 120 are mounted in front of collimator 118 to shield patient 116 from radiation. Blocks 120 reduce the size of beam 114 to a beam 122 which irradiates the region of patient 116 to be treated.

The X-ray image is captured by device 124 which can be a CR plate or a direct digital capture device, such as a scintillator-electronic imager device.

Figure 12:
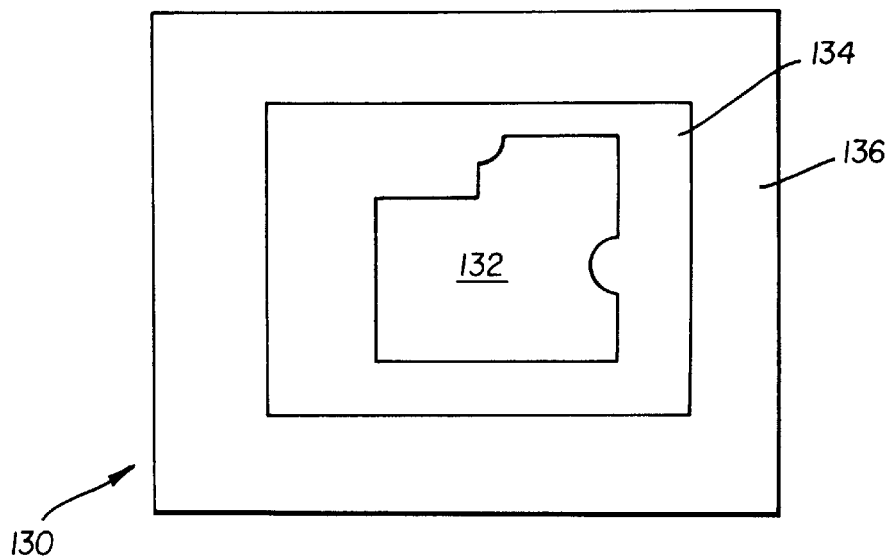

FIG. 12 is a diagrammatic view illustrating the X-ray image captured by device 124. Image 130 includes a central region 132 representing the radiation field, a region 134 outward of region 132 representing the collimation field region blocked by blocks 120, and a region 136 representing the region blocked by collimator 118.

It is a feature of the present invention to enhance the image in regions 132 and 134 without adding edge-banding artifacts around high-contrast edges. Region 136 is blackened to produce a contrast enhanced output image.

Figure 1:
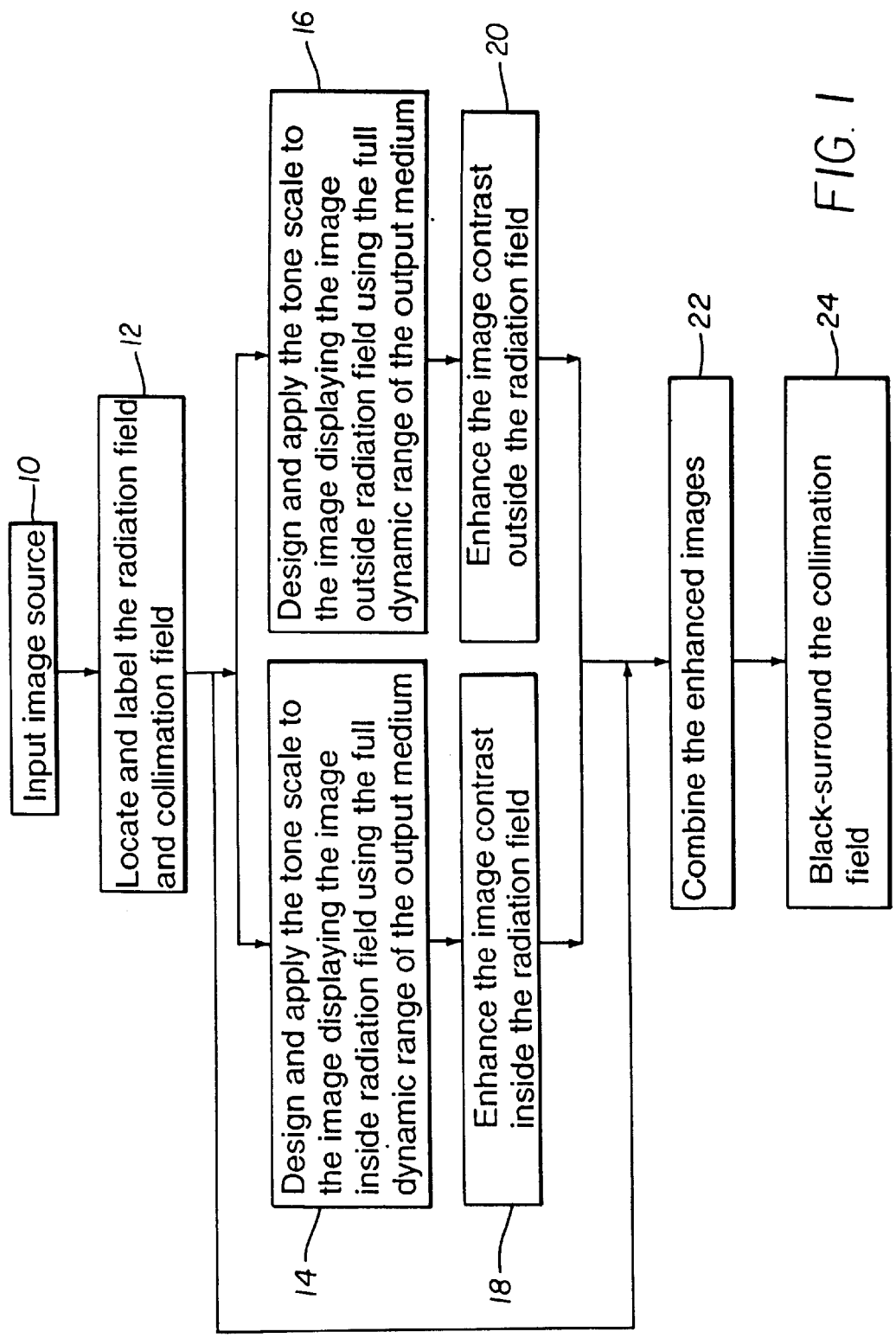
FIG. 1 is a block diagram of an embodiment of the present invention.

Referring now to FIG. 1, there will be described an embodiment of the method of the present invention. As shown, an input digital image is provided from an input image source.

The input digital image 10 is first passed into an algorithm of locating and labeling the radiation and collimation fields 12. This operation is performed to generate the labeled radiation field image and the labeled collimation field image. The labeled radiation field image is a binary image whose pixels inside and outside the radiation field are 1 and 0, respectively. The labeled collimation field image is a binary image whose pixels inside and outside the collimation field are 1 and 0, respectively.

Once the interior and exterior regions of the radiation field are identified, the next step is to develop an optimal method to display these regions using a tone scaling and the contrast enhancement algorithm. The major function of a tone scaling algorithm is to stretch or compress the dynamic range of the input image into a dynamic range of the output medium such that the output medium can render the image effectively. The goal of rendering the digital portal image effectively is to have the image both inside and outside the radiation field displayed using the full dynamic range of the output medium. This invention discloses a method of formulating the given input tone scale curve into the appropriate tone scale curves to display the digital portal image effectively. Therefore, one tone scale curve, which is called the radiation tone scale curve, is designed and maps the image inside the radiation field into the full dynamic range of the output medium 14. While the other tone scale curve, which is called the collimation tone scale curve, is also designed and maps the image outside the radiation field into the full dynamic range of the output medium 16.

The contrast enhancement algorithm is then applied to the tone scale enhanced image both inside and outside the radiation field 18, 20. The important image details that radiation oncologists use for checking the treatment setup are the high-contrast edges at coarse level where subtle image details have been smoothed out. In this invention, a tool, (see: Docket 82297/WFN, U.S. patent application U.S. Ser. No. 09/824,602, filed on Apr. 2, 2001, "Method for improving breast cancer diagnosis using mountain-view and contrast-enhancement presentation of mammography", inventor Susan S. Young), called contrast-enhancement presentation based on edge-wavelet filters is applied for this purpose.

The output image is the combination of the enhanced images that have the appropriate radiation and collimation tone scales, respectively 22. As a result, the image details inside the radiation field are enhanced and displayed using the full dynamic range of the output medium, while the image details outside the radiation field but inside the collimation field are enhanced and displayed using the full dynamic range of the output medium too. At the final stage, the pixels outside the collimation field are replaced with a uniform value such that they appear as black 24.

The input digital portal images can be captured and digitized by various imaging devices. It is important to calibrate the digital image to the desired metric. In the following description of this invention, all images are calibrated to relative log X-ray exposure. For convenience, the relative log X-ray exposure is scaled up by a factor of 1000 so that one can use only integer values to represent the input and output images. However, the intermediate results from the various filters are represented as floating point numbers, so that proper precision is always retained.

The detailed procedures of this invention are described in the following four sections:

Locating and labeling the radiation and collimation fields

Design of the tone scale curves

Contrast-enhancement

Producing the output image

1. Locating and Labeling the Radiation and Collimation Fields

In this invention, the radiation and collimation fields are located and labeled first. Then the appropriate tone scaling and contrast enhancement can be applied to each field accordingly. The image details in both fields can be displayed using the full dynamic range of the output medium.

Figure 2:
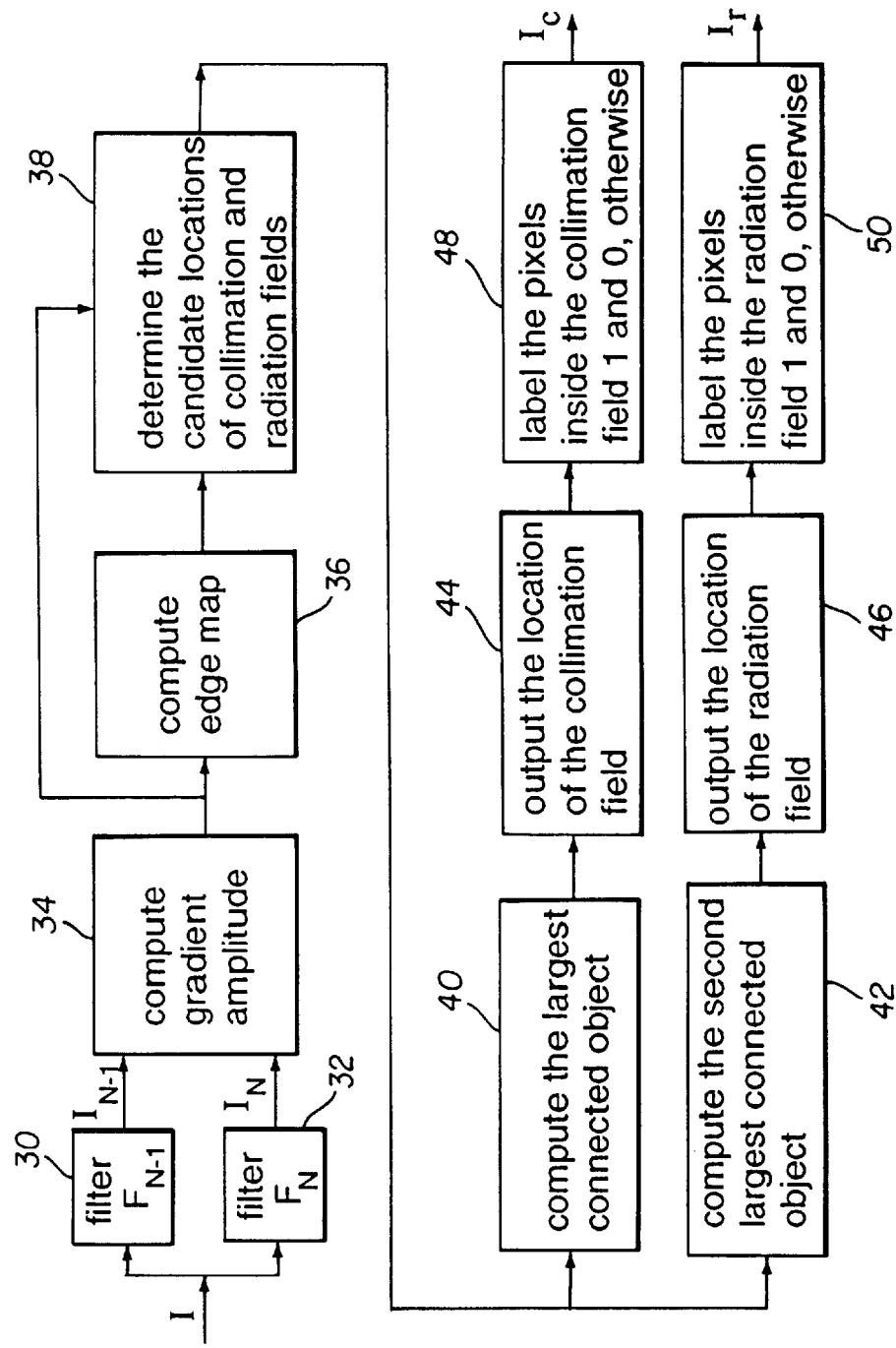
FIG. 2 is a block diagram of an element of the invention of FIG. 1, i.e., the algorithm of locating and labeling the radiation and collimation fields.

FIG. 2 is a block diagram of a method for locating and labeling the radiation and collimation fields. The input image I is first passed through two filters $F_{N-1}$ and $F_N$ 30, 32 to produce the edge information in the horizontal and vertical directions in the coarsest resolution N/2. In the preferred embodiment, N/2=4. The filters used in this invention have the following frequency responses ($\omega_x$ and $\omega_y$ are the spatial angular frequency in the x and y directions):

$$U_k(\omega_x, \omega_y) = \prod_{i=1}^{k} S(2^{i-1}\omega_x)S(2^{i-1}\omega_y), k = 1, 2, \ldots, N/2, U_0(\omega_x, \omega_y) = 1$$

$F_k(\omega_x, \omega_y) = U_{(k-1)/2}(\omega_x, \omega_y)R(2^{(k-1)/2}\omega_x), k=1,3, \ldots N-1$ (k is an odd number)

$F_k(\omega_x, \omega_y) = U_{(k-2)/2}(\omega_x, \omega_y)R(2^{(k-2)/2}\omega_y), k=2,4, \ldots, N$ (k is an even number)

where $$S(\omega) = \cos^4\left(\frac{\omega}{2}\right)$$

$$R(\omega) = i\sin\left(\frac{\omega}{2}\right)e^{i\omega/2}$$

The algorithm then calculates the edge gradient from the filters' outputs, $I_{N-1}$ and $I_N$ 34. The edge gradient amplitude is computed by taking the square root of the sum of square of $I_{N-1}$ and the square of $I_N$. Next the algorithm computes the edge map 36 by finding the local maximum gradient magnitude along the gradient direction. The edge map is a binary image where the pixel value 1 represents the local maximum gradient pixels and pixel value 0 represents other pixels. The algorithm then determines the candidate locations of the collimation and radiation fields by setting a threshold on the local maximum gradient pixels 38. Since the edges of the radiation and collimation fields are much stronger than the edges of other anatomical structures in the digital portal images, it is natural to remove the small edges by thresholding the local maximum gradient pixels at the coarsest resolution. Therefore, there are no pixels at the edges of radiation and collimation fields that are missed and the small edges are removed to simplify further analysis.

A digital portal image may contain other objects with strong edges, such as lead markers, labels, etc. The gradient amplitude values at these objects may be comparable to the gradient amplitude at the edges of the collimation and radiation fields. The candidate locations of the collimation and radiation fields may contain these objects. In order to determine the locations of the collimation and radiation fields, the largest and the second largest connected objects are computed in the next step 40, 42. The collimation field always circumscribes the radiation field. The collimation field is determined by the location of the largest connected object 44. The radiation field is determined by the location of the second largest connected object 46.

The last step is to label the radiation and collimation fields 48, 50. The output binary image $I_c(x, y)$ is 1 inside the collimation field and 0, otherwise. Similarly, the output binary image $I_r(x, y)$ is 1 inside the radiation field and 0, otherwise.

2. Design of the Tone Scale Curves

Figure 3:
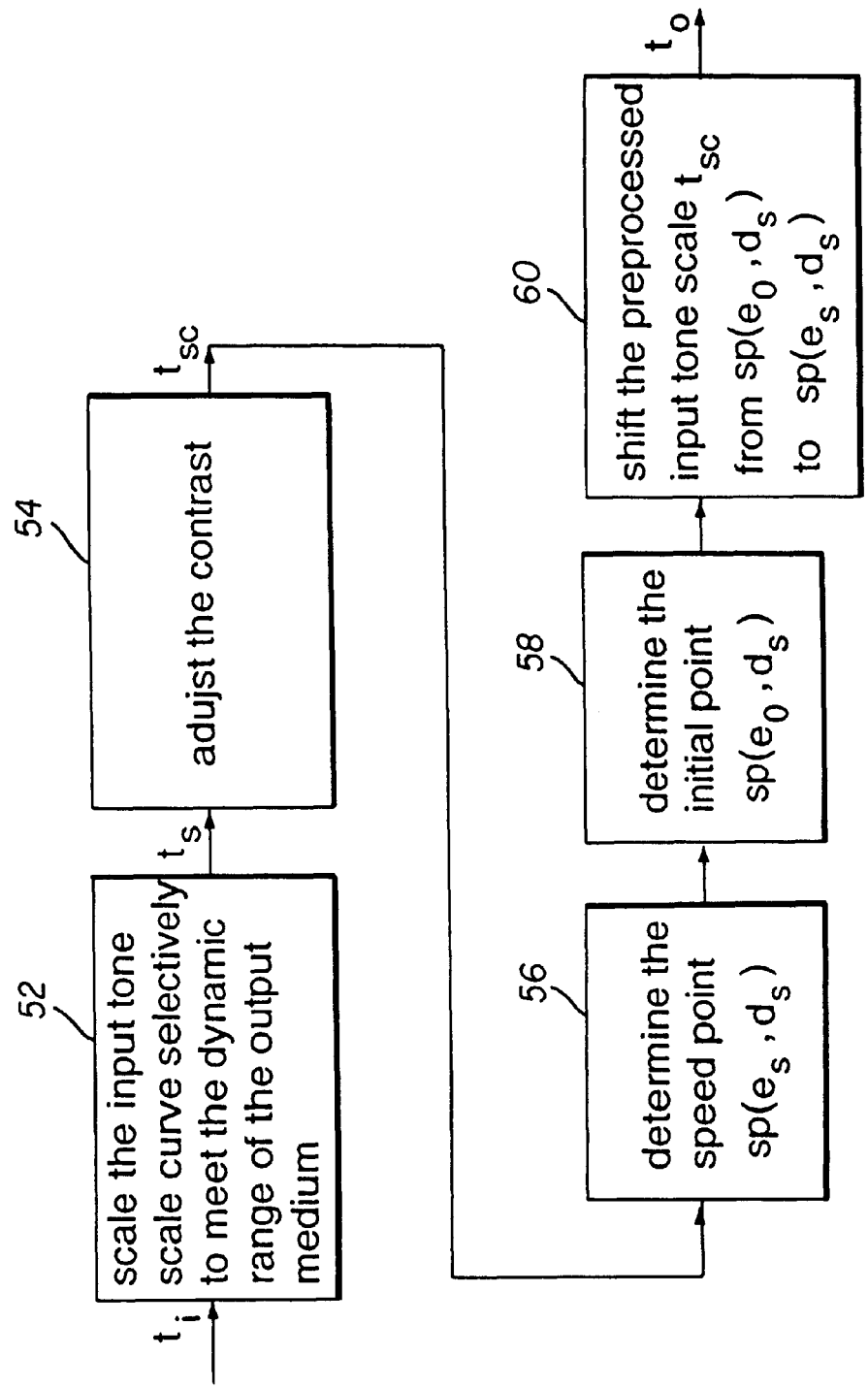
FIG. 3 is a block diagram of another element of the invention of FIG. 1, i.e., the design of the tone scale curves.

By convention, the tone scale is defined as the log exposure to density conversion curve. The horizontal axis of a tone scale curve in this invention represents the log exposure code values. The vertical axis of the tone scale represents the density code values, which are linearly related to the output density. FIG. 3 shows a diagram of the design of tone scale curves. For an input tone scale, $t_i$, it is scaled selectively to produce $t_s$ to meet the dynamic range of the output medium first 52. The input tone scale curve could be the one that is computed by the visually optimized method or the one that is designed for a certain type of film. Usually, one particular tone scale curve might not be designed for a new output medium, e.g., the new printer system might have a higher or lower density range than the range of the tone scale curve. The algorithm in this invention scales the tone scale curve selectively instead of linearly to meet the dynamic range of the output medium. This allows the image to be displayed in the designated output medium effectively. $t_s$ is then adjusted for contrast to produce $t_{sc}$ 54. In order then, the speed point sp ($e_s$, $d_s$) is determined (box 56), the initial point sp ($e_o$, $d_s$) is determined 58, and the preprocessed input tone scale $t_{sc}$ is shifted from sp ($e_o$, $d_s$) to sp ($e_s$, $d_s$) to produce the output tone curve $t_o$ 60.

Figure 4A:
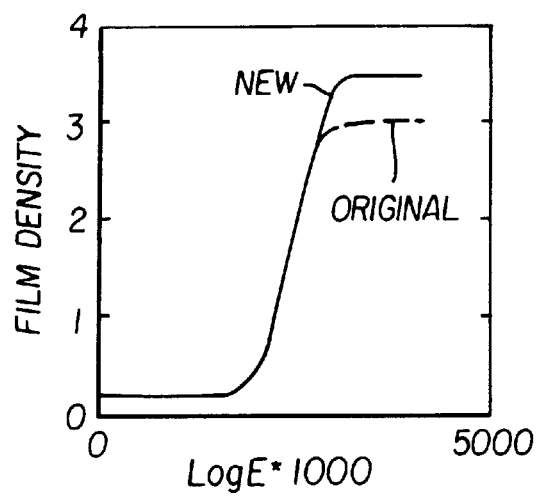
FIGS. 4a–4c are graphical views illustrating an example of selectively scaling the input tone scale curve to meet the dynamic range of the output medium.
Figure 4B:
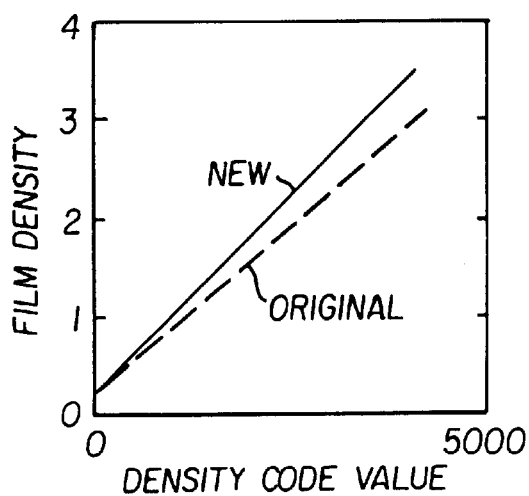
Figure 4C:
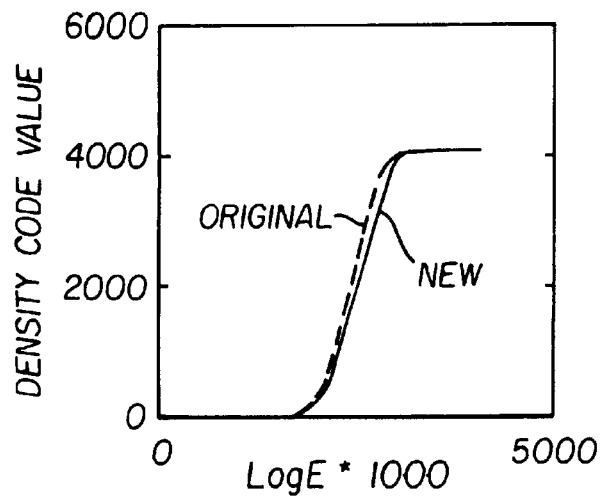

FIGS. 4a–4c show examples of selectively scaling the input tone scale curve to meet the dynamic range of the output medium. In FIG. 4a, the original D-LogE curve (dashed line) spans the dynamic range from 0.21 to 3.0 in density unit, while the new desired D-LogE curve has the density range from 0.21 to 3.5. The new D-LogE curve (solid line) is scaled selectively such that the tone scale curve is the same as the original one from the density 0.21 to 3 and is expanded to the density 3.5 using a smooth function. This operation keeps the printer's response as the original one for the lower density range and takes the advantage of the higher density range of the new printer system. FIG. 4b shows the linear relationship between the output density and the density code values for the original (dashed lines) and new (solid line) density ranges. The original (dashed line) and the selectively scaled (solid line) tone scale curves are shown in FIG. 4c.

Figure 5A:
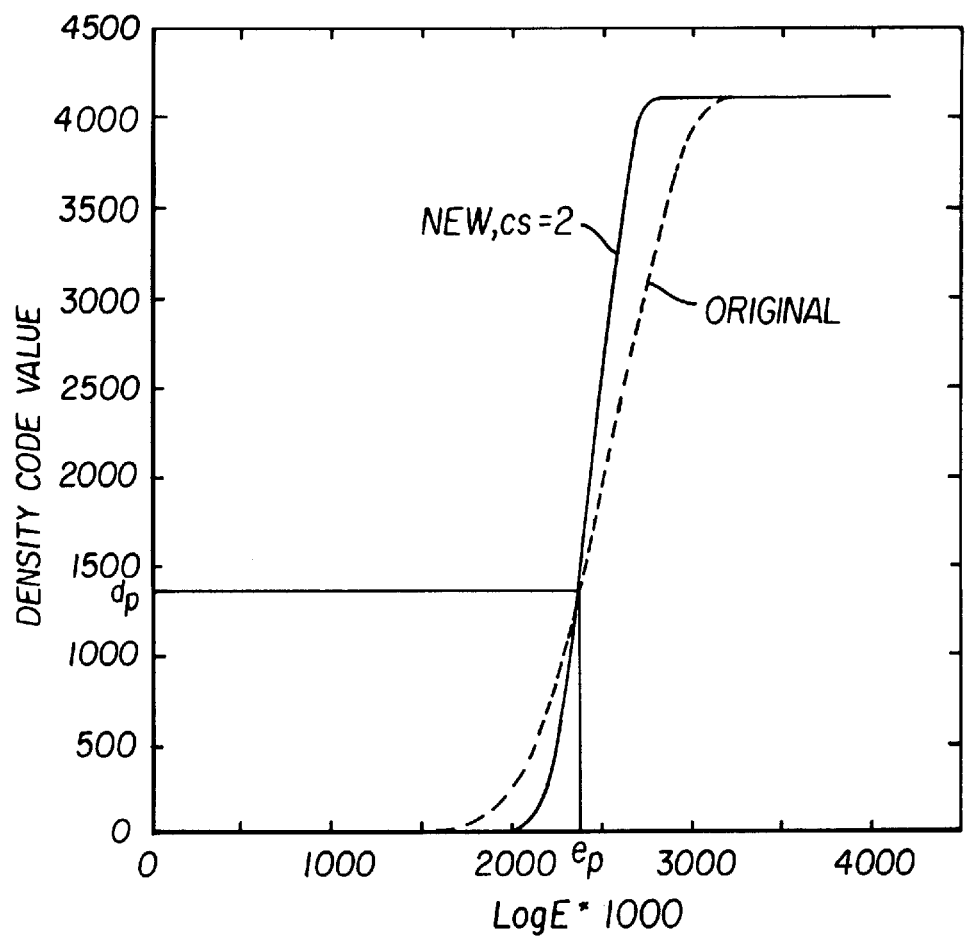
FIG. 5a is a graphical view showing a comparison of the new, contrast adjusted tone scale curve (solid line) and the original tone scale curve (dashed line).

In the next step of the design of the tone scale curves, the contrast of the scaled tone scale curve is adjusted (FIG. 3, 54). For special applications, the contrast of the input tone scale curve might not be appropriate for the input image. For example, a digital portal image requires a tone scale curve with a higher contrast to effectively map the input image to the output medium. The crucial point of adjusting the contrast of a tone scale curve is to select a pivot point. At this pivot point, the contrast is unchanged. This pivot point is defined as a pair of points, $pp(e_p, d_p)$, where $e_p$ represents the log exposure code value and $d_p$ represents the density code value. In this invention, the pivot point is determined such that $d_p$ is selected as the unchanged density code value and $e_p$ is the corresponding log exposure code value that is obtained from the inverse tone scale curve. Then, the contrast adjusted input tone scale curve, $t_{sc}$, is produced by the following. In the case of increasing the contrast, the density code values for the points above $d_p$ are increased by a contrast factor, while the density code values for the points below $d_p$ are decreased by a contrast factor. In the case of decreasing the contrast, the operation is opposite. FIG. 5a shows this phenomenon.

This unchanged density code value can be calculated directly from the output density value. The unchanged density value can be selected between the minimum and maximum of the output medium. For a laser printer with the minimum density 0.21 and the maximum density 3.5, the middle density point is about 1.6. In the preferred embodiment, the unchanged density point is selected as 1.6 for the collimation tone scale curve, and 1.3 for the radiation tone scale curve. Because the image portion that is inside the radiation field is acquired by a higher radiation, it appears darker in the digital portal image. By selecting the unchanged density point at a lower density, the tone scale maps most of the image inside the radiation field to a lower density. The image inside the radiation field appears even brighter than the image outside the radiation field.

Figure 5B:
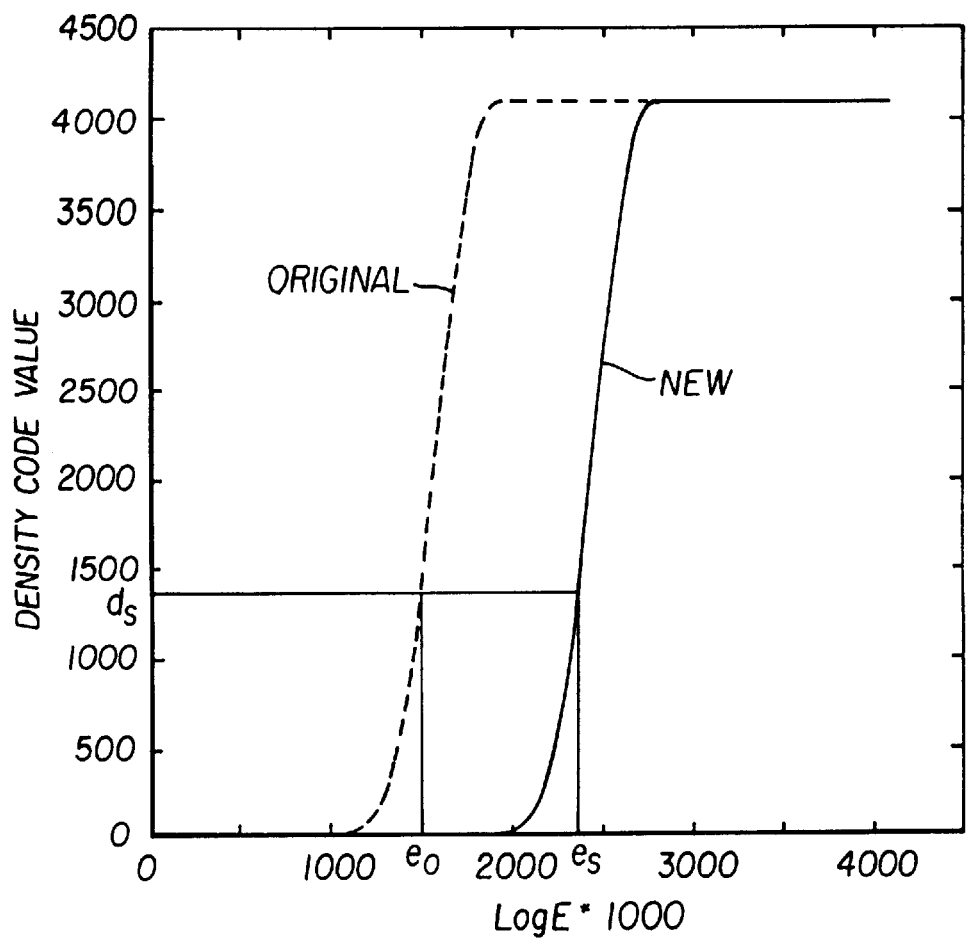
FIG. 5b is a graphical view showing a comparison of the new, shifted tone scale curve (solid line) and the original tone scale curve (dashed line).

In the last step of the design of the tone scale curves, the algorithm determines the speed point of the tone scale curve (FIG. 3, 56). The concept of the speed point is inherited from film processing. The speed point is the point where the input tone scale curve is shifted to such that the span of the tone scale curve covers the dynamic range of the input image. The speed point of the tone scale is determined by a pair of points, $sp(e_s, d_s)$, where $e_s$ represents the log exposure code value and $d_s$ represents the density code value. In this invention, $e_s$ is determined by the log exposure code value corresponding to the peak of the histogram of the region of interest in the input image, and $d_s$ is determined by the unchanged density code value. The initial point $e_0$ is determined (FIG. 3, 58) by the corresponding log exposure code value of $d_s$, which is obtained from the inverse tone scale curve $t_{sc}$. Then the scaled and contrast adjusted tone scale curve $t_{sc}$ is shifted to the speed point $sp(e_s, d_s)$ from the initial point $sp(e_0, d_s)$ to generate the output tone scale curve $t_o$. FIG. 5b shows this situation.

Figure 6:
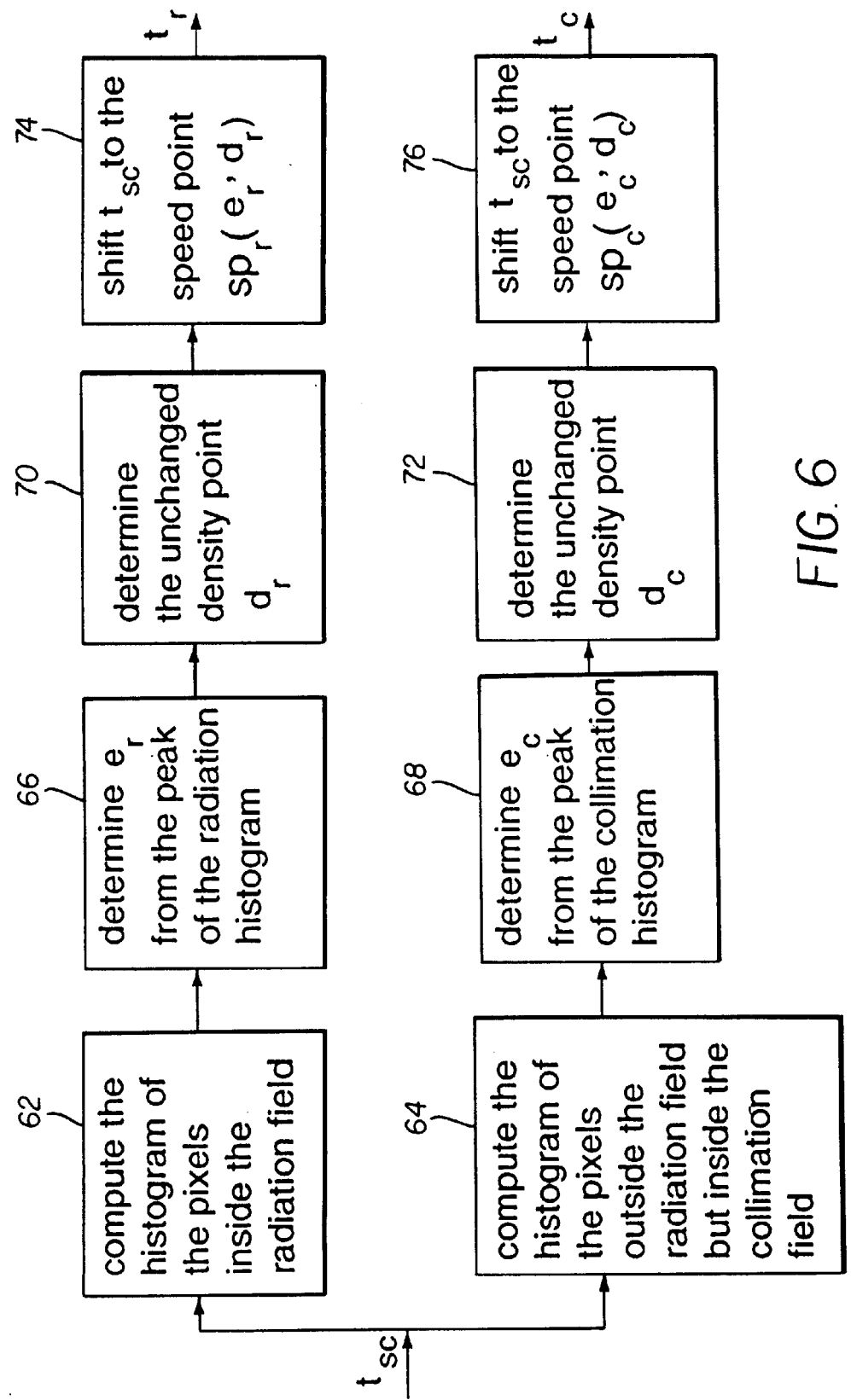
FIG. 6 is a block diagram of determining the speed points for the radiation and collimation tone scale curves.
Figure 7:
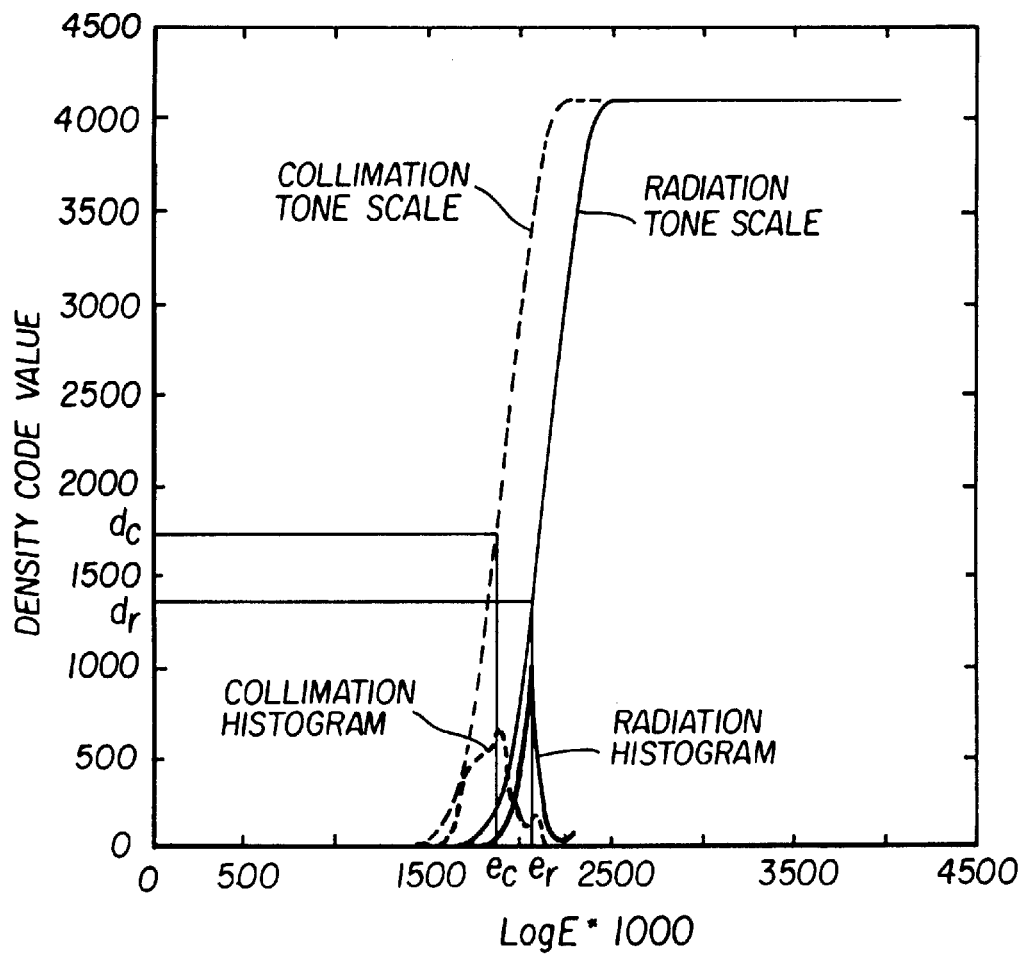
FIG. 7 is a graphical view showing an example of the radiation and collimation tone scale curves designed using the preferred embodiment of this invention.

FIG. 6 illustrates the preferred embodiment of determining the speed points for the radiation and collimation tone scale curves $t_{sc}$. First the histogram of the pixels inside the radiation field is computed, which is called the radiation histogram 62. The speed point of the radiation tone scale curve, $sp_r(e_r, d_r)$, is determined from the peak of the radiation histogram, $e_r$, and the unchanged density code value $d_r$ 66, 70. The scaled and contrast adjusted input tone scale $t_{sc}$ is shifted to the selected speed point to output the radiation tone scale curve $t_r$ 74. Similarly, the histogram of the pixels outside the radiation field but inside the collimation field is calculated, which is called the collimation histogram 64. The speed point of the collimation tone scale curve, $sp_c(e_c, d_c)$, is determined from the peak of the collimation histogram, $e_c$, and the unchanged density code value $d_c$ 68, 72. The collimation tone scale curve $t_c$ is obtained by shifting the scaled and contrast adjusted input tone scale curve $t_{sc}$ to the selected speed point $sp_c(e_c, d_c)$ 76. FIG. 7 shows an example of the radiation (solid line) and collimation (dashed line) tone scale curves designed using the above method.

3. Contrast-Enhancement

Figure 8:
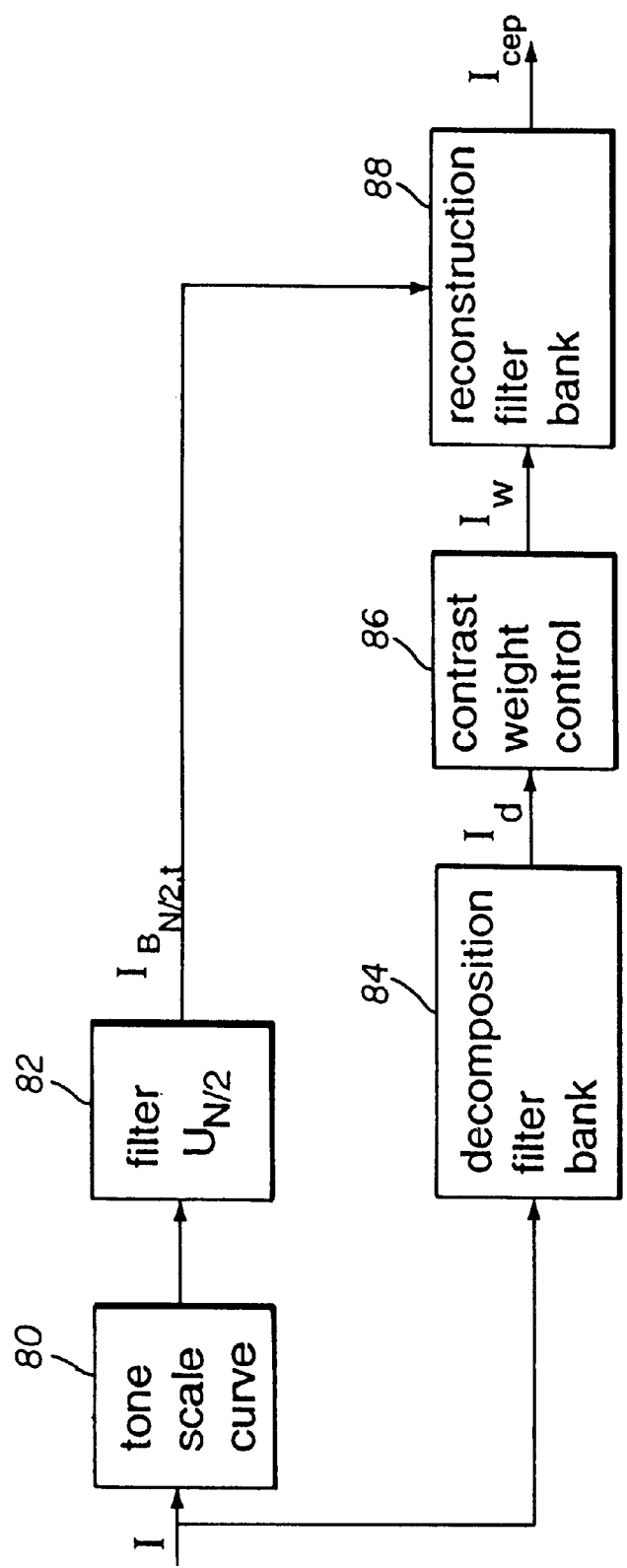
FIG. 8 is a block diagram of the contrast enhancement algorithm of the embodiment of the invention shown in FIG. 1.

FIG. 8 shows the diagram of the contrast enhancement procedure in this invention. The input image I is processed using a tone scale 80 before it passed through the filter $U_{N/2}$ 82 to produce the lowest resolution version of the tone-scaled image, $I_{B_{N/2},t}$. In another path, the input image I is passed through the decomposition filter bank 84 to produce $I_d$. The contrast weight control mechanism 86 produces the desired weighting factors for the output from the decomposition bank, $I_d$, to produce $I_w$. Then the output image is reconstructed using a reconstruction filter bank from $I_w$ and $I_{B_{N/2},t}$ 88. Because the edge information is determined at the coarse scale and adjusted at each scale before it is input to the reconstruction filter bank, the output reconstructed image $I_{cep}$ contains useful enhanced image details, and also contains a right dynamic range to match the intended output medium. (The details of this tool was described in U.S. patent application Ser. No. 09/824,602, filed on Apr. 2, 2001, Docket 82297/WFN, "Method for improving breast cancer diagnosis using mountain-view and contrast-enhancement presentation of mammograph", inventor Susan S. Young).

In the preferred embodiment, when the radiation tone scale curve $t_r$ is used, the output image is the contrast-enhanced radiation field image, $I_{cep,r}$. When the collimation tone scale curve $t_c$ is used, the output image is the contrast-enhanced collimation field image, $I_{cep,c}$.

4. Producing the Output Image

Figure 9:
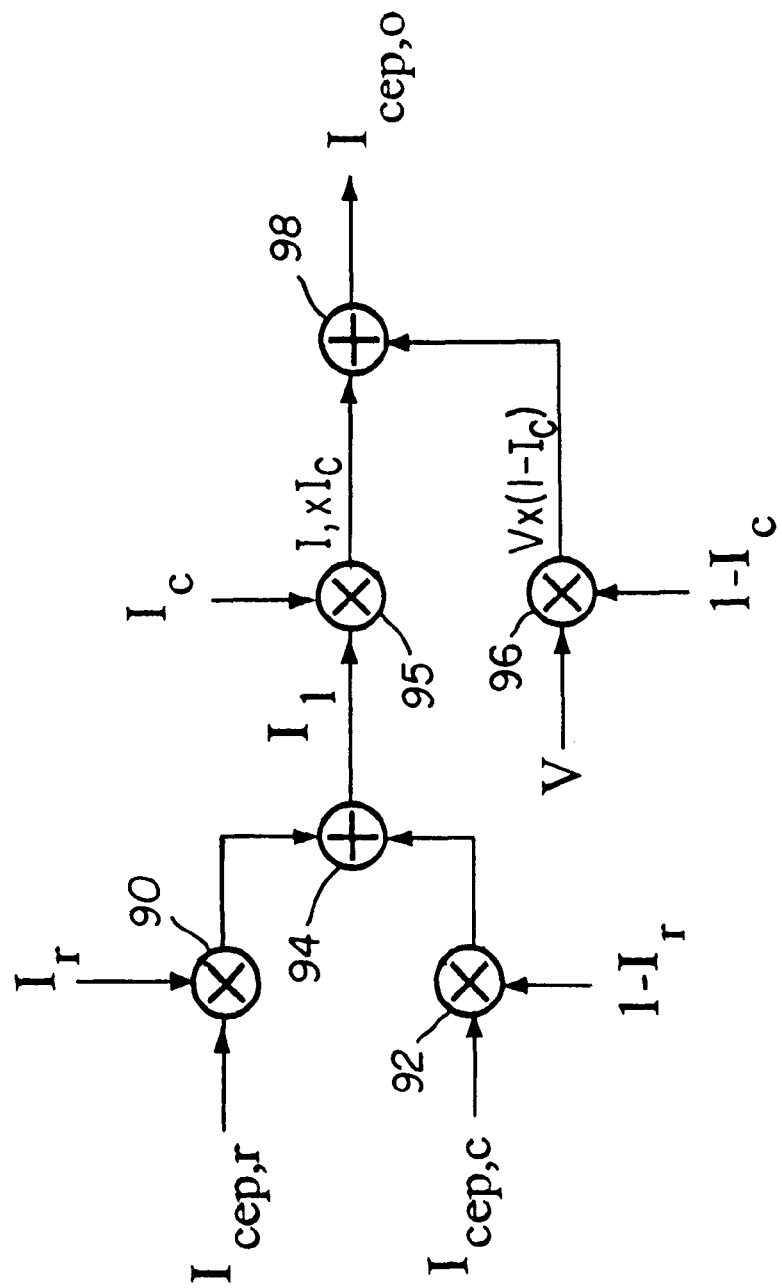
FIG. 9 is a block diagram of producing the output image of the embodiment of the invention shown in FIG. 1.

FIG. 9 shows the diagram of combining the images $I_{ces,r}$ and $I_{cep,c}$ to produce the final output image $I_{cep,o}$. The combining can be carried out in software, firmware or hardware using multipliers 90, 92, 95, 96 and adders 94, 98, as shown. First, the intermediate image $I_1$ is produced by the sum of two signals, $I_{cep,r} \times I_r$ and $I_{cep,c} \times (1-I_r)$, where $I_r$ is the labeled radiation field image. This intermediate image $I_1$ represents the image inside the radiation field using the enhanced radiation field image $I_{cep,r}$ and the image outside the radiation field using the enhanced collimation field image $I_{cep,c}$. In the last stage, the black-surrounding the collimation field is completed by summing two signals, $I_1$ 33 $I_c$ and $V \times (1-I_c)$, where $I_c$ is the labeled collimation field image and V is a constant value. In the preferred embodiment, for a 12 bit input image, V is selected as 4095 to make the pixels outside the collimation field appear black.

The invention has been described in detail with particular reference to certain preferred embodiments thereof, but it will be understood that variations and modifications can be effected within the spirit and scope of the invention.

PARTS LIST 10 image source
12 locate and label the radiation field and collimation field
14 design and apply tone scale inside radiation field
16 design and apply tone scale outside radiation field
18 enhance image contrast inside the radiation field 20 enhance image contrast outside the radiation field
22 combine enhanced images
24 black-surround the collimation field
30,32 filters
34 compute gradient amplitude
36 compute edge map
38 determine candidate locations of collimation and radiation fields
40 compute the largest connected object
42 compute the second largest connected object
44 output the location of the collimation field
46 output the location of the radiation field
48 label the pixels inside the collimation field
50 label the pixels inside the radiation field
52 scale the input tone scale curve to meet dynamic range of output medium
54 adjust the contrast
56 determine speed point
58 determine initial point
60 shift preprocessed input tone scale
62 radiation histogram
64 collimation histogram
66 determine the peak of radiation histogram
68 determine the peak of collimation histogram
70 determine unchanged density point
72 determine unchanged density point
74,76 speed point
80 tone scale curve
82 filter
84 decomposition filter bank
86 contrast weight control
88 reconstruction filter bank
90,92,95,96 multipliers
94,98 adders
100 input image system
102 input image source
104 image processor
106 output
110 system
112 X-ray source
114 X-ray beam
116 patient
118 collimator
120 blocks
122 beam
124 device
130 image
132,134 regions
136 region

What is claimed is:

1. A method for enhancing the image contrast of digital portal images for presentation on an output medium comprising:

providing an input digital portal image having radiation and collimation fields;

locating and labeling said radiation and collimation fields to produce labeled radiation and labeled collimation field images;

designing a tone scale curve to display the image inside the radiation field using the full dynamic range of said output medium;

applying said tone scale curve to the input digital portal image to produce a tone-scaled radiation field image;

designing a tone scale curve to display the image outside the radiation field using the full dynamic range of the output medium;

applying said tone scale curve to the input digital portal image to produce a tone-scaled collimation field image;

enhancing the image contrast of said tone-scaled radiation field image and said tone-scaled collimation field image;

combining said enhanced images using the labeled radiation and collimation field images; and black-surrounding the collimation field to produce a contrast enhancement output image which can be presented on said output medium.

2. The method of claim 1 wherein said locating and labeling the radiation and collimation fields includes:

providing an input digital portal image;

applying a decomposition filter bank to said digital portal image to produce a high-passed input image in a coarse scale;

computing the gradient amplitude of the high-passed input image at a coarse scale;

computing a binary edge map image where value 1 represents the pixels being the local maximum gradient magnitude along the gradient direction and value 0 represents other pixels;

determining the candidate locations of said collimation and radiation fields by thresholding the local maximum gradient magnitude;

computing the largest connected object;

determining the location of said collimation field as the location of the largest connected object;

computing the second largest connected object;

determining the location of said radiation field as the location of the second largest connected object;

labeling the pixels inside said collimation field 1 and 0, otherwise to produce said labeled collimation field image; and labeling the pixels inside the radiation field 1 and 0, otherwise to produce said labeled radiation field image.

3. The method of claim 1 wherein said designing a tone scale curve includes:

providing an input tone scale curve;

scaling the input tone scale curve selectively to meet the dynamic range of said output medium to produce the scaled tone scale curve;

adjusting the contrast of the scaled input tone scale to produce said scaled and contrast adjusted tone scale curve;

determining the speed point;

determining the initial point; and shifting the scaled and contrast adjusted tone scale curve to the speed point from the initial point to produce said output tone scale curve.

4. The method of claim 3 wherein said the determining the speed point includes:

computing the histogram of the pixels inside the radiation field;

determining $e_r$ from the peak of the radiation histogram;

determining $d_r$ from the unchanged density point;

outputting the speed point $sp_r(e_r, d_r)$ of the radiation tone scale curve;

computing the histogram of the pixels outside said radiation field but inside said collimation field;

determining $e_c$ from the peak of the collimation histogram;

determining $d_c$ from the unchanged density point; and outputting the speed point $sp_c(e_c, d_c)$ of said collimation tone scale curve.

5. The method of claim 1 wherein said enhancing the image contrast includes:

applying the tone scale curve to the input portal image to produce a tone-scaled image;

applying a decomposition filter bank to the input portal image;

applying a decomposition filter bank to the tone-scaled image;

generating contrast weight control signals from said input digital portal image by extracting the high contrast edge signals at the coarse scale;

adjusting the decomposition outputs from said input image according to the contrast weight control signals; and applying a reconstruction filter bank to said adjusted signals and said tone-scaled signals to produce a contrast enhancement output image.

6. A method for enhancing the image contrast of digital portal images for presentation on an output medium comprising:

providing an input digital portal image having radiation and collimation fields;

locating and labeling the radiation and collimation fields to produce the labeled radiation and labeled collimation field images;

designing a tone scale curve to display the image inside the radiation field using the full dynamic range of said output medium;

applying said tone scale curve to the input digital portal image to produce a tone-scaled radiation field image;

designing a tone scale curve to display the image outside the radiation field using the full dynamic range of the output medium;

applying said tone scale curve to the input digital portal image to produce a tone-scaled collimation field image;

combining said tone-scaled radiation field image and said tone-scaled collimation field image using said labeled radiation and collimation field images; and black-surrounding the collimation field to produce a contrast enhancement output image which can be presented on said output medium.

7. The method of claim 6 wherein said locating and labeling the radiation and collimation fields includes:

providing an input digital portal image;

applying a decomposition filter bank to said digital portal image to produce a high-passed input image in a coarse scale;

computing the gradient amplitude of the high-passed input image at a coarse scale;

computing a binary edge map image where value 1 represents the pixels being the local maximum gradient magnitude along the gradient direction and value 0 represents other pixels;

determining the candidate locations of collimation and radiation fields by thresholding the local maximum gradient magnitude;

computing the largest connected object;

determining the location of said collimation field as the location of the largest connected object;

computing the second largest connected object;

determining the location of said radiation field as the location of the second largest connected object;

labeling the pixels inside said collimation field 1 and 0, otherwise, to produce said labeled collimation field image; and labeling the pixels inside said radiation field 1 and 0, otherwise, to produce said labeled radiation field image.

8. The method of claim 6 wherein said designing a tone scale curve includes:

providing an input tone scale curve;

scaling said input tone scale curve selectively to meet the dynamic range of said output medium to produce said scaled tone scale curve;

adjusting the contrast of said scaled input tone scale to produce said scaled and contrast adjusted tone scale curve;

determining the speed point;

determining the initial point; and shifting said scaled and contrast adjusted tone scale curve to said speed point from said initial point to produce said output tone scale curve.

9. The method of claim 8 wherein said determining the speed point includes:

computing the histogram of the pixels inside said radiation field;

determining $e_r$ from the peak of said radiation histogram;

determining $d_r$ from the unchanged density point;

outputting the speed point $sp_r(e_r, d_r)$ of said radiation tone scale curve;

computing the histogram of the pixels outside said radiation field but inside the collimation field;

determining $e_c$ from the peak of said collimation histogram;

determining $d_c$ from the unchanged density point; and outputting the speed point $sp_c(e_c, d_c)$ of said collimation tone scale curve.

10. A method for enhancing the image contrast of a digital image for presentation on an output medium comprising:

providing an input digital image having at least first and second fields;

locating and labeling said first and second fields to produce labeled first and second field images;

designing a tone scale curve to display the first field image using the full dynamic range of said output medium;

applying said tone scale curve to the input digital image to produce a tone-scaled first field image;

designing a tone scale curve to display the second field image using the full dynamic range of the output medium;

applying said tone scale curve to the input digital image to produce a tone-scaled second field image;

enhancing the image contrast of said tone-scaled first field image and said second field image;

combining said enhanced images using the labeled first and second field images; and black-surrounding the first and second fields to produce a contrast enhancement output image which can be presented on said output medium.

11. The method of claim 10 wherein said locating and labeling the first and second fields includes:

providing an input digital image having a first field surrounding a second field;

applying a decomposition filter bank to said digital image to produce a high-passed input image in a coarse scale;

computing the gradient amplitude of the high-passed input image at a coarse scale;

computing a binary edge map image where value 1 represents the pixels being the local maximum gradient magnitude along the gradient direction and value 0 represents other pixels;

determining the candidate locations of said first and second fields by thresholding the local maximum gradient magnitude;

computing the largest connected object;

determining the location of said first field as the location of the largest connected object;

computing the second largest connected object;

determining the location of said second field as the location of the second largest connected object;

labeling the pixels inside said first field 1 and 0, otherwise to produce said labeled first field image; and labeling the pixels inside the second field 1 and 0, otherwise to produce said labeled second field image.

12. The method of claim 10 wherein said designing a tone scale curve includes:

providing an input tone scale curve;

scaling the input tone scale curve selectively to meet the dynamic range of said output medium to produce the scaled tone scale curve;

adjusting the contrast of the scaled input tone scale to produce said scaled and contrast adjusted tone scale curve;

determining the speed point;

determining the initial point; and shifting the scaled and contrast adjusted tone scale curve to the speed point from the initial point to produce said output tone scale curve.

13. The method of claim 12 wherein said the determining the speed point includes:

computing the histogram of the pixels inside the first field;

determining $e_r$ from the peak of said first histogram;

determining $d_r$ from the unchanged density point;

outputting the speed point $sp_r(e_r, d_r)$ of said first tone scale curve;

computing the histogram of the pixels outside said first field but inside said second field;

determining $e_c$ from the peak of the second histogram;

determining $d_c$ from the unchanged density point; and outputting the speed point $sp_c(e_c, d_c)$ of said second tone scale curve.

14. The method of claim 10 wherein said enhancing the image contrast includes:

applying the tone scale curve to the input digital image to produce a tone-scaled image;

applying a decomposition filter bank to the input digital image;

applying a decomposition filter bank to the tone-scaled image;

generating contrast weight control signals from said input digital image by extracting the high contrast edge signals at the coarse scale;

adjusting the decomposition outputs from said input image according to the contrast weight control signals; and applying a reconstruction filter bank to said adjusted signals and said tone-scaled signals to produce a contrast enhancement output image.

15. A method for enhancing the image contrast of a digital image for presentation on an output medium comprising:

providing an input digital image having first and second fields;

locating and labeling the first and second fields to produce the labeled first and second collimation field images;

designing a tone scale curve to display the first field image using the full dynamic range of said output medium;

applying said tone scale curve to the input digital image to produce a tone-scaled first field image;

designing a tone scale curve to display the second field image using the full dynamic range of the output medium;

applying said tone scale curve to the input digital image to produce a tone-scaled second field image;

combining said tone-scaled first field image and said tone-scaled second field image using said labeled first and second field images; and black-surrounding the first and second fields to produce a contrast enhancement output image which can be presented on said output medium.

16. The method of claim 15 wherein said locating and labeling the first and second fields includes:

providing an input digital image having a first field surrounding a second field;

applying a decomposition filter bank to said digital image to produce a high-passed input image in a coarse scale;

computing the gradient amplitude of the high-passed input image at a coarse scale;

computing a binary edge map image where value 1 represents the pixels being the local maximum gradient magnitude along the gradient direction and value 0 represents other pixels;

determining the candidate locations of first and second fields by thresholding the local maximum gradient magnitude;

computing the largest connected object;

determining the location of said first field as the location of the largest connected object;

computing the second largest connected object;

determining the location of said second field as the location of the second largest connected object;

labeling the pixels inside said first field 1 and 0, otherwise, to produce said labeled first field image; and labeling the pixels inside said second field 1 and 0, otherwise, to produce said labeled second field image.

17. The method of claim 15 wherein said designing a tone scale curve includes:

providing an input tone scale curve;

scaling said input tone scale curve selectively to meet the dynamic range of said output medium to produce said scaled tone scale curve;

adjusting the contrast of said scaled input tone scale to produce said scaled and contrast adjusted tone scale curve;

determining the speed point;

determining the initial point; and shifting said scaled and contrast adjusted tone scale curve to said speed point from said initial point to produce said output tone scale curve.

18. The method of claim 17 wherein said determining the speed point includes:

computing the histogram of the pixels inside said first field;

determining $e_r$ from the peak of said first histogram;

determining $d_r$ from the unchanged density point;

outputting the speed point $sp_r(e_r, d_r)$ of said first tone scale curve;

computing the histogram of the pixels outside said first field but inside the second field;

determining $e_c$ from the peak of said second histogram;

determining $d_c$ from the unchanged density point; and outputting the speed point $sp_c(e_c, d_c)$ of said second tone scale curve.

* * * * *